United States Patent [19]

David et al.

[11] Patent Number: 5,437,021
[45] Date of Patent: Jul. 25, 1995

[54] PROGRAMMABLE DEDICATED TIMER OPERATING ON A CLOCK INDEPENDENT OF PROCESSOR TIMER

[75] Inventors: Howard S. David, Beaverton; Orville H. Christeson, Portland, both of Oreg.

[73] Assignee: Intel Corporation, Santa Clara, Calif.

[21] Appl. No.: 897,897

[22] Filed: Jun. 12, 1992

[51] Int. Cl.$^6$ .............................................. G06F 1/00
[52] U.S. Cl. .................. 395/550; 364/271.5; 364/280.9
[58] Field of Search ........................................ 395/550

[56] References Cited

U.S. PATENT DOCUMENTS

| | | | |
|---|---|---|---|
| 4,161,787 | 7/1979 | Groves et al. | 364/900 |
| 5,247,654 | 9/1993 | Hamid et al. | 395/550 |
| 5,274,796 | 12/1993 | Conner | 395/550 |
| 5,297,275 | 3/1994 | Thayer | 395/550 |

OTHER PUBLICATIONS

Texas Instruments Manual(Preliminary) *TACT84500 EISA Chip User's Guide*, pp. 6–24, "EISA Peripheral Control Unit Functions", Oct. 10, 1991.

*Primary Examiner*—Kevin A. Kriess
*Assistant Examiner*—Matthew M. Payne
*Attorney, Agent, or Firm*—Blakely, Sokoloff, Taylor & Zafman

[57] ABSTRACT

A hardware timer dedicated to the BIOS which operates independent of the CPU timer. The BIOS activates the timer by writing a delay count to a predetermined port. Address decode circuitry identifies an address match to a write port address. When an address match coincides with a write command from the BIOS, write control circuitry coupled to the address decode circuitry activates a "load" signal for loading the delay count into a counter circuit. The counter circuit, which is coupled to the write control circuitry, operates on a clock having frequency independent of the CPU operating frequency. The counter circuit comprises a flip-flop that synchronizes the "load" signal to the clock of the counter circuit. The synchronized "load" signal causes the delay count to be loaded into the counter circuit. The write control circuitry inactivates the "load" signal such that the delay count is loaded exactly once. The counter circuit counts when the synchronized "load" signal is inactive. A count disable circuit within the counter circuit causes the counter circuit to stop counting when it reaches its terminal count.

Once counting begins, the BIOS reads from a predetermined I/O port to determine if the programmed delay has been completed through a read control circuit. The read control circuit enables a result onto the data bus of the computer system when an address match coincides with a read command from the BIOS. When the BIOS reads the terminal count, the programmed delay is complete.

27 Claims, 3 Drawing Sheets

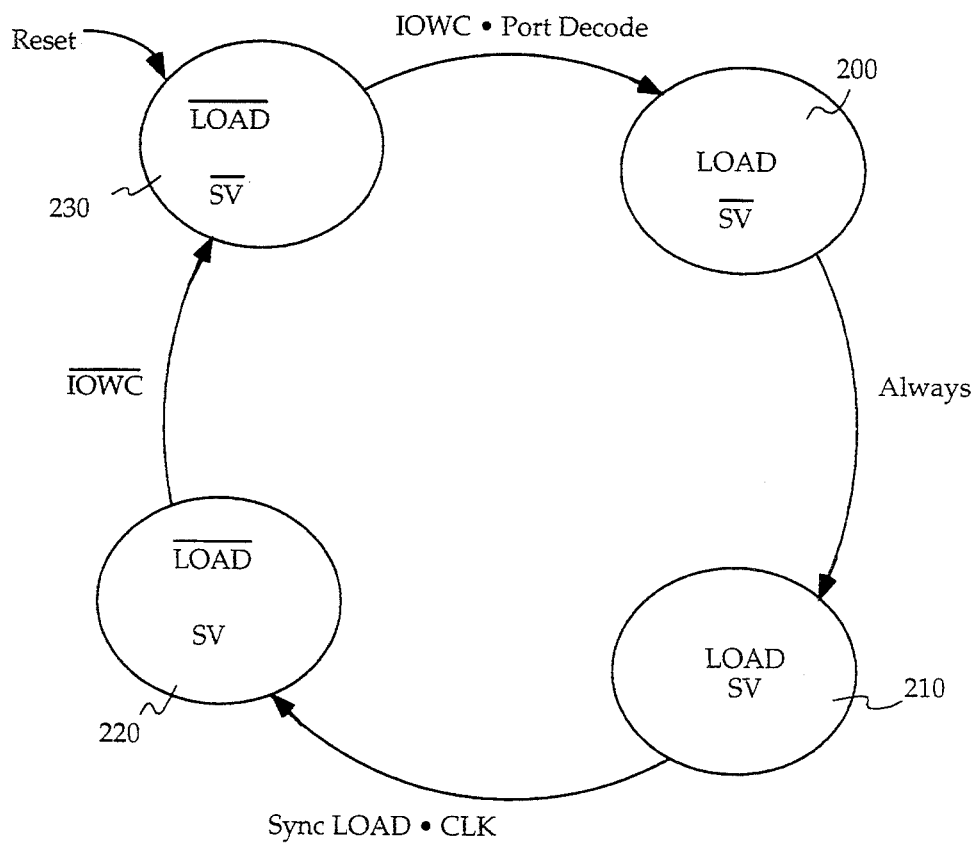
Figure 2(a)
Figure 2(b)
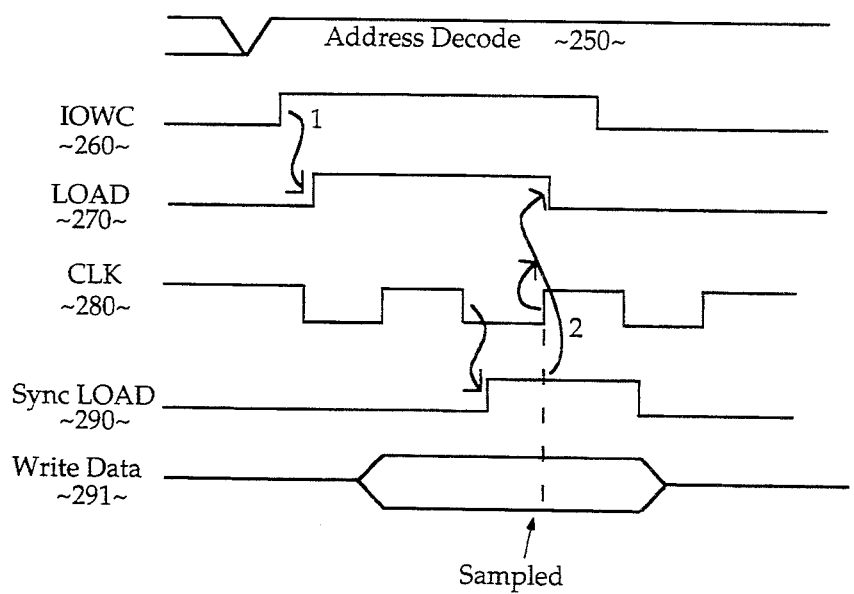

PROGRAMMABLE DEDICATED TIMER OPERATING ON A CLOCK INDEPENDENT OF PROCESSOR TIMER

BACKGROUND OF THE INVENTION

1. Field of the Invention

The present invention relates to the basic input output systems ("BIOS") of a personal computer system, and more specifically to the timer mechanism associated with the BIOS.

2. Art Background

The BIOS of a personal computer system, like most firmware, must provide time delays of minimum and/or maximum values when communicating with certain hardware devices. An example of a device which needs accurate delays is the floppy disk controller of a personal computer system. In prior computer systems, the time delays were accomplished by software timing loops, where a series of harmless instructions were executed a predetermined number of times. This was quite satisfactory to the prior art computer systems because the length of time required to complete each instruction, and hence the series of the instructions, could be calculated based on the CPU ("Central Processing Unit") and the speed at which it was operating. Each time a new CPU was installed or the speed was increased, new calculations were done and the resulting values were incorporated into the timing loops.

Two developments have occurred to make software timing loops less accurate and less desirable. First, CPUs have become more complex with the addition of instruction pre-fetch queues, and second, the more extensive use of cache memory, both internal and external, in today's computers. A given set of instructions may or may not repeatedly execute at the same speed depending on such factors as whether they all fit into the pre-fetch queue, whether they are always fetched from the cache memory, whether the CPU is always running at the same speed and whether the interrupts or pre-fetch cycles are occurring within the loops.

An even more complex situation arises with modular architecture of today's technology. Modular architecture is a design where a variety of CPU modules, containing different CPUs (some with and some without cache memories), and running at vastly differing speeds, can be inserted into a main logic board containing the BIOS. Software timing loops for such a BIOS would need to be extremely intelligent and recalculate each time one of the parameters affecting its speed is altered. Such a solution is undesirable because of the space such code would consume and the time required to do the many recalculations.

Therefore, a hardware timer becomes a desirable feature, given the above considerations. Some hardware timers do exist on the computers, but they can be taken over by operating systems and some application programs due to their non-dedicated nature to the BIOS. Further, they do not achieve the timing resolutions needed by the BIOS.

As will be described in the following description, the dedicated BIOS hardware timer described herein meets the need described above without any of the problems inherent in software timing loops.

SUMMARY OF THE INVENTION

Therefore, it is an object of the present invention to provide a dedicated BIOS timer independent of the speed and/or type of its processor.

It is also an object of the present invention to provide a dedicated BIOS timer without using software timing loops applicable only to a limited range of processors.

A dedicated hardware timer for the exclusive use of the BIOS is provided to avoid the problem of operating system or diagnostic software interfering with the proper operation of the timer. The BIOS activates the timer by writing a delay count to a predetermined port in the personal computer system. The timer comprises address decode circuitry which identifies an address match to the write port address. Coupled to the address decoder is write control circuitry which activates an appropriate "load" signal for loading the delay count into a counter circuit. The "load" signal is generated by the combination of the address decode matching, and a write command signal from the BIOS. Coupled to the write control circuitry is a counter circuit which operates on a fixed frequency clock that is independent of the CPU operating frequency. The counter circuit comprises a flip-flop that synchronizes the "load" signal to the clock of the counter. Coupled to the synchronizing flip/flop is a multi-bit counter, with inputs for load enable, load data, count enable, and outputs for terminal count, and count data. The synchronized "load" signal causes the delay count to be loaded into the counter. The write control circuitry inactivates the "load" signal at an appropriate time, so that the delay count is loaded exactly once into the counter. When the synchronized "load" signal is inactive, the counter will count up or down, until it reaches its terminal count. Coupled to the counter is a count disable circuit that causes the counter to stop counting when it reaches its terminal count.

The value that the BIOS programs into the timer depends on the delay required. For example, if the frequency is 2 MHz, and the delay count is programmed to 200, then the counter will reach its terminal value after 100 microseconds.

After the delay count has been written into the timer, the BIOS will read from a predetermined I/O port to determine if the programmed delay has been completed. The timer comprises address decode circuitry which identifies an address match to the read port address. Coupled to the address decode circuitry is a read control circuit for reading back the status of the counter. The read control circuit enables a result onto the data bus of the personal computer system by the combination of the address decode matching, and a read command signal from the BIOS. The result may be a single bit, the terminal count from the counter, or the result may be the current value of the counter. The read control circuit may comprise a latch circuit to latch the result on the leading edge of the read command, so that the result is guaranteed stable at the ending edge of the read command. When the BIOS reads the terminal count result, the programmed delay is complete.

BRIEF DESCRIPTION OF THE DRAWINGS

The objects, features and advantages of the present invention will become apparent to one skilled in the art from reading the following detailed description in which:

FIGS. 2a illustrates a state diagram for the write control block.

FIGS. 2b illustrates a timing diagram for the BIOS timer during a write.

DETAILED DESCRIPTION OF THE INVENTION

In the following description, numerous specific details are set forth such as data bits, address bits and counter size, etc., in order to provide a thorough understanding of the present invention. It will be obvious, however, to one skilled in the art that these details are not required to practice the present invention. In other instances, well-known circuits, methods and the like are not set forth in detail in order to avoid unnecessarily obscuring the present invention.

Figure 1:
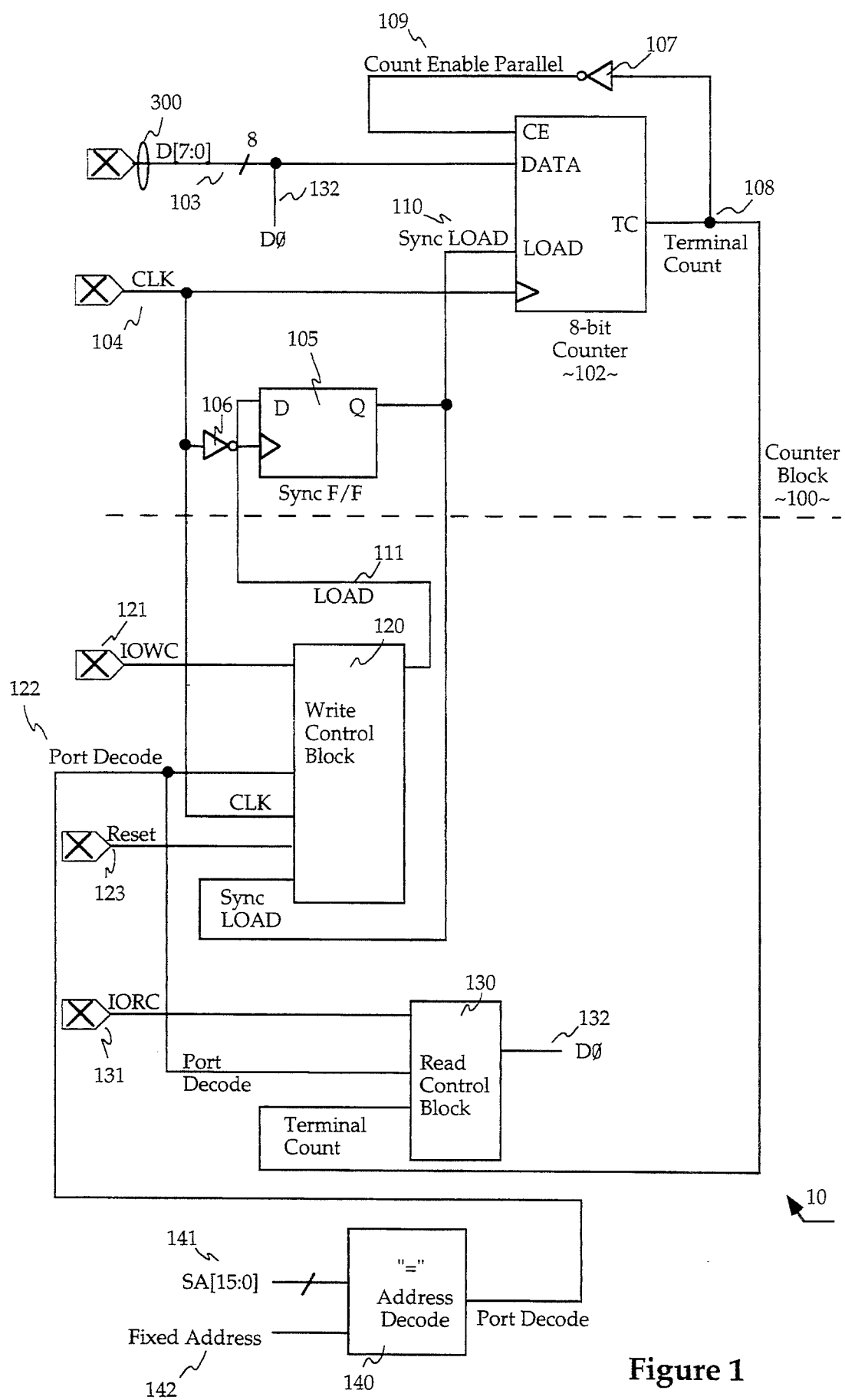
FIG. 1 illustrates a functional block diagram for the BIOS timer of the present invention.

Reference is now made to FIG. 1, where a functional block diagram of the dedicated hardware BIOS timer 10 of the present invention is illustrated. The dedicated hardware BIOS timer 10 allows the BIOS (not shown) to be time independent from processor speed. The BIOS activates the BIOS timer 10 by writing a delay count to a predetermined port 300 and the timer 10 notifies the BIOS when the timer reaches a terminal count. The BIOS timer 10 comprises four functional blocks: counter block 100, write control block 120, read control block 130, and address decode block 140.

Within counter block 100, data D[7:0] 103 is input to 8-bit counter 102 via bi-directional port 300, which is clocked by signal CLK 104 of fixed frequency independent of the CPU (not shown) operating frequency. The counter 102 is loaded upon signal Sync LOAD 110, which is output from synchronizer flip-flop ("Sync F/F") 105. An inverted fixed frequency CLK signal through inverter 106 is applied to clock Sync F/F 105. Sync F/F 105 receives an input from LOAD 111 from write control block 120.

It should be noted that CLK 104 is currently fixed at 2 MHz for the reason that a slower clock will lose its accuracy while a faster clock will require more bits. Those skilled in the art should be able to determine the appropriate clock frequency for their systems. It should also be noted that data input to Counter is a preprogrammed value based on which I/O subsystem the BIOS is controlling, whether it is a hard disk drive, floppy disk drive or speaker.

Write control block 120 receives input signals IOWC (I/O write command) 121, Port Decode 122, CLK 104, Reset 123 and Sync LOAD 110 to activate an output LOAD signal 111 for Sync F/F 105.

Read control block 130 receives input signals IORC (I/O read command) 131, Port Decode 122 and Terminal Count 108 from 8-bit counter 102 to generate an output signal D∅ 132. Signal Port Decode 122 is generated from address decode block 140, which receives System Address SA[15:0] 141 and fixed address 142 as inputs.

Counter 102 currently is a countdown counter running at a fixed frequency as applied from signal CLK 104. It should be noted, however, that other sizes and direction of the count are available to those skilled in the art. Sync F/F 105 is used to synchronize LOAD signal 111 to generate Sync LOAD 110 for loading 8-bit counter 102 and write control block 120. Inverter 107 receives Terminal Count 108 from 8-bit counter 102 to generate Count Enable Parallel 109 for disabling the counter 102 once it reaches zero. Sync F/F 105 uses the falling edge of signal CLK 104 to synchronize signal LOAD 111 to generate signal Sync LOAD 110 which meets the set-up and hold times of counter 102 at the rising edge of signal CLK 104. Another way to determine the counter 102 has reached its extreme value is to read back the value of the counter 102, when terminal count 108 is not used.

Write control block 120 creates a LOAD pulse 111 for 8-bit counter 102 based on Port Decode 122 from address decode block 140 and write command pulse IOWC 121. The write command pulse IOWC 121 can be short while the write data must remain valid for two clock periods from the leading edge of the write command pulse IOWC 121 because the data is not latched on its own outside 8-bit counter 102. Those skilled in the art can choose to latch the write data external to the counter to relax the timing requirements of the counter block.

Reference is now made to FIG. 2a, where a state diagram for the write control block is illustrated. Signal LOAD is asserted when there is a write command pulse IOWC and the address is matched to the predetermined port as indicated by Port Decode. Thus, if the address decoder is looking for Port 78h and the address on the PC bus is equal to 78h with the presence of a write command pulse IOWC, a LOAD signal is generated from write control block. To create a LOAD pulse that lasts for precisely one CLK's rising edge, a 2-bit state machine is used as illustrated in FIG. 2a. The two state machine bits are called LOAD and STATE VARIABLE ("SV"). During a write, data is only on the PC bus for a certain amount of time so that in a write, LOAD is turned on and always jumps to the next state which turns on the SV 210. As the LOAD signal is synchronized by the synchronizer flip-flop, it becomes the signal Sync LOAD, which is the output from the synchronizing flip-flop 105.

Reference is now made to FIG. 2b, where a timing diagram for the BIOS timer during a write is illustrated. Note that signal LOAD 270 is asserted by the rising edge of write command pulse IOWC 260 and address decode 250 (Reference Point No. 1). The falling edge of CLK 280 will cause Sync LOAD 290 to be asserted and half a clock later (Reference Point No. 2) when CLK 280 becomes true, i.e. the rising edge, the state machine turns off the LOAD signal 270. As such, when Sync LOAD 290 is true and CLK 280 goes high, counter has received Sync LOAD 290 such that LOAD 270 can be turned off. At the same time, write data 291 is sampled on the rising edge of CLK 280 when Sync LOAD 290 is true.

Figure 3:
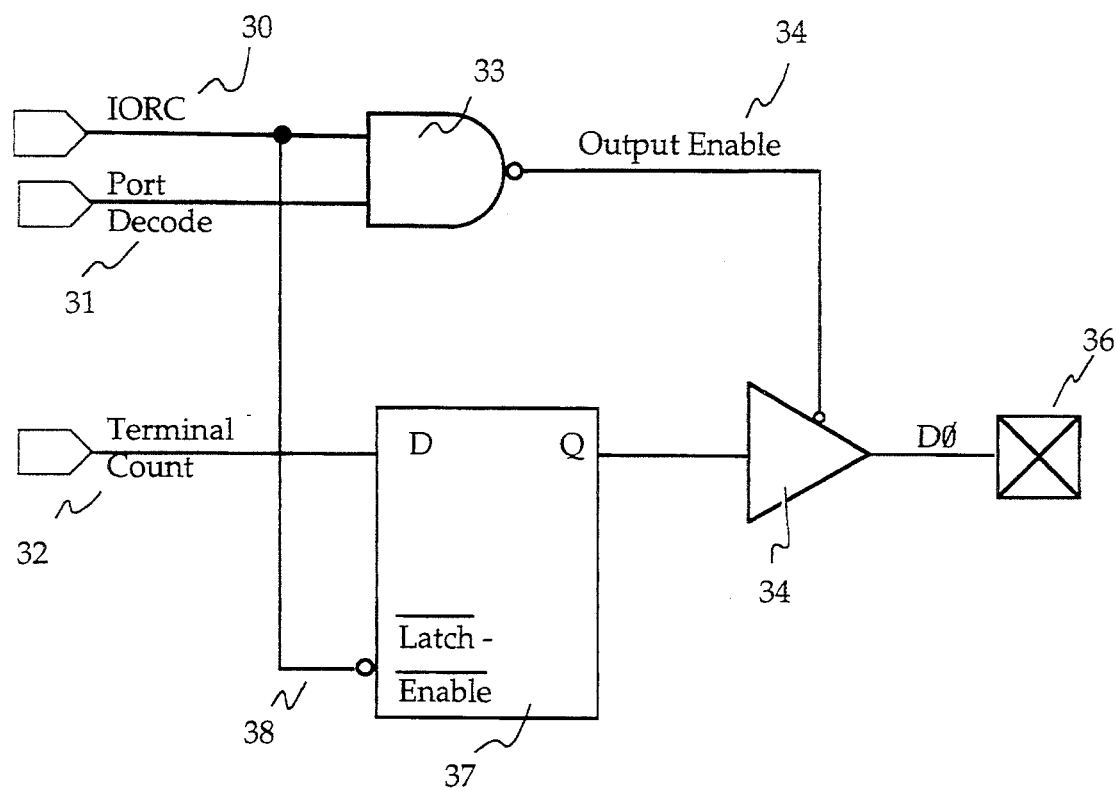
FIG. 3 illustrates a schematic for the read control block.

Reference is now made to FIG. 3, where a schematic for the read control block (FIG. 1, 130) is illustrated. When read command IORC 30 and Port Decode 31 are both true, Output Enable 34 is asserted at the output of the NAND gate 33. Output Enable 34 drives buffer 34 to control bit D∅ 36. Bit D∅ is provided to the BIOS through bi-directional port 300. Terminal Count 32 is propagated through latch 37 when IORC 30 is low due to the low-true Latch Enable 38. When read command IORC 30 goes high, latch 37 latches Terminal Count 32 so that the data bit cannot change. It should be noted that data can also be read back upon the assertion of Output Enable 34.

Although the preferred embodiment shown in FIG. 1 uses a read and write port at a single address, it should be appreciated by those skilled in the art that separate read and write ports can also be implemented to achieve the same functionality.

Reference is now made to FIG. 1. Address decode 140 is an equality comparator, which compares system address (SA) bits 141 with the predetermined port address 142. Address decode 140 decodes the sixteen lowest address bits because no more is necessary for I/O addresses from 0000h to 03FFh. A port address less than or equal to FFh is chosen to allow for the simplest IN and OUT instructions, currently at port 78h. However, it should be apparent to those skilled in the art that any port, memory or I/O, may be used for this purpose.

The foregoing description of the invention has been presented for the purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of providing a dedicated hardware timer for a Basic Input/Output System (BIOS) of a personal computer system, said personal computer system having a Central Processing Unit (CPU) operating on a first clock, said BIOS activating said dedicated hardware timer by issuing a write command with a delay count and a write port address, said method comprising the steps of:

determining whether said write port address specified by said write command corresponds to a predetermined write port through first address decoding means coupled to said BIOS;

activating a LOAD signal for a predetermined time through write control means coupled to said first address decoding means, said LOAD signal being activated when both said port address specified by said write command matches said predetermined write port and said write command remains valid;

loading said delay count and counting from said delay count to a predetermined count through counter means coupled to said write control means, said counter means inputting said delay count after synchronizing said LOAD signal to a second clock having frequency independent of said first clock to activate a SYNC LOAD signal, said counter means inputting said delay count only once in response to said SYNC LOAD signal and counting synchronously with said second clock, said counter means counting when said SYNC LOAD signal is de-activated, said counter means disabling counting when said predetermined count is reached;

notifying said BIOS when said counter means has reached said predetermined count through read control means coupled to counter means, said BIOS issuing a read command with a read port address to a predetermined read port, said read control means reading the status of said counter means to said BIOS through said predetermined read port when both said read command is valid and said predetermined read port is specified by said read port address, said read control means latching the status of said counter means upon activation of said read command to ensure that said status is stable upon deactivation of said read command.

2. A method according claim 1, further comprising the step of:

determining whether said read port address matches said predetermined read port through second address decoding means, such that said read control means reads the status of said counter means to said BIOS through said predetermined read port when both said read command is valid and said predetermined read port is specified by said read command.

3. A method according to claim 1, wherein said counter means comprises a flip-flop for synchronizing said LOAD signal from said write control means to a falling edge of said second clock to activate said SYNC LOAD signal.

4. A method according to claim 3, wherein said counter means comprises a count disable means for causing said counter means to stop counting when said counter means reaches said predetermined count.

5. A method according to claim 4, wherein said counter means comprises a multi-bit counter counting down from said delay count to zero, said multi-bit counter asserting a one-bit Terminal Count signal upon reaching zero.

6. A dedicated hardware timer for a Basic Input/Output System (BIOS) of a personal computer system, the personal computer system having a Central Processing Unit (CPU) operating on a CPU clock, the BIOS activating the dedicated hardware timer by issuing a write command with a delay count and a write port address, the dedicated hardware timer comprising:

address decode circuitry coupled to the BIOS for determining whether the write port address received from the BIOS corresponds to a predetermined port and for determining whether a read port address received from the BIOS corresponds to said predetermined port;

write control circuitry coupled to the address decode circuitry for activating a LOAD signal for a predetermined time, the LOAD signal being activated when both the write port address specified by the write command corresponds to the predetermined port and the write command remains valid;

counter circuitry coupled to the write control circuitry for receiving the LOAD signal and the delay count and for counting from the delay count to a predetermined count, the counter circuitry synchronizing the LOAD signal to a second clock having frequency independent of the CPU clock to generate a SYNC LOAD signal, the counter circuitry inputting the delay count only once in response to the SYNC LOAD signal and counting synchronously with the second clock when the SYNC LOAD signal is de-activated until the predetermined count is reached; and read control circuitry coupled to the counter circuitry for notifying the BIOS when the counter circuitry has reached the predetermined count, the BIOS issuing a read command, the read control circuitry reading the status of the counter circuitry to the BIOS through the predetermined port when both the read command is valid and the read port address corresponds to the predetermined port, the read control circuitry latching the status of the counter circuitry upon activation of the read command to ensure that the status is stable upon deactivation of the read command.

7. A dedicated hardware timer according to claim 6, wherein the counter circuitry comprises a flip-flop for synchronizing the LOAD signal from the write control circuitry to a falling edge of the second clock to activate the SYNC LOAD signal.

8. A dedicated hardware timer according to claim 7, wherein the counter circuitry comprises a count disable circuitry for causing the counter circuitry to stop counting when the counter circuitry reaches the predetermined count.

9. A dedicated hardware timer according to claim 8, wherein the counter circuitry comprises a multi-bit counter for counting down from the delay count to zero, the multi-bit counter asserting a one-bit Terminal Count signal when reaching zero.

10. A dedicated hardware timer according to claim 8, wherein the counter circuitry comprises a multi-bit counter for counting up from the delay count to the predetermined count such that the count disable circuitry disables the multi-bit counter upon the multi-bit counter reaching the predetermined count.

11. A dedicated hardware timer according to claim 6, wherein the predetermined port is a bi-directional port for both writing the delay count and reading the status of the counter circuitry to the BIOS.

12. A dedicated hardware timer according to claim 9, wherein the read control circuitry comprises:
- a NAND gate for generating an ENABLE signal when both the read command is valid and the read port address corresponds to the predetermined port; and
- latch circuitry coupled to the NAND gate for receiving the read command, the one-bit Terminal Count, and the ENABLE signal, the latch circuitry for latching the status of the one-bit Terminal Count upon activation of the read command and outputting the one-bit Terminal Count as a least significant bit for the status of the counter circuitry upon the ENABLE signal from the NAND gate.

13. A dedicated hardware timer according to claim 12, wherein the address decode circuitry is an equality comparator for comparing the write port address with a predetermined write port address associated with said predetermined port and for comparing the read port address with a predetermined read port address associated with said predetermined port.

14. A dedicated hardware timer according to claim 13, wherein the predetermined port is an Input/Output (I/O) port.

15. A dedicated hardware timer according to claim 13, wherein the predetermined port is a memory port.

16. A dedicated hardware timer for a Basic Input/Output System (BIOS) of a personal computer system, the personal computer system having a Central Processing Unit (CPU) operating on a first clock, the BIOS activating the dedicated hardware timer by issuing a write command with a delay count and a write port address, the dedicated hardware timer comprising:
- first address decoding means coupled to the BIOS for determining whether the write port address specified by the write command corresponds to a predetermined write port;
- write control means coupled to the first address decoding means for activating a LOAD signal for a predetermined time the LOAD signal being activated when both the write port address specified by the write command corresponds to the predetermined write port and the write command remains valid;
- counter means coupled to the write control means for receiving the LOAD signal and the delay count and for counting from the delay count to a predetermined count, the counter means generating a SYNC LOAD signal in response to both the LOAD signal and a second clock having frequency independent of the first clock, the counter means inputting the delay count only once in response to the SYNC LOAD signal and counting synchronously with the second clock when the SYNC LOAD signal is de-activated until the predetermined count is reached; and
- read control means coupled to counter means for notifying the BIOS when the counter means has reached the predetermined count, the BIOS issuing a read command with a read port address, the read control means reading the status of the counter means to the BIOS through a predetermined read port when both the read command is valid and the read port address corresponds to the predetermined read port, the read control means latching the status of the counter means upon activation of the read command to ensure that the status is stable upon de-activation of the read command.

17. A dedicated hardware timer according to claim 16, further comprising:
- second address decoding means for determining whether the read port address corresponds to the predetermined read port such that the read control means reads the status of the counter means to the BIOS through the predetermined read port when both the read command is valid and the read port address corresponds to the predetermined read port.

18. A dedicated hardware timer according to claim 16, wherein the counter means comprises a flip-flop for synchronizing the LOAD signal from the write control means to a falling edge of the second clock to activate the SYNC LOAD signal.

19. A dedicated hardware timer according to claim 18, wherein the counter means comprises a count disable means for causing the counter means to stop counting when the counter means reaches the predetermined count.

20. A dedicated hardware timer according to claim 19, wherein the counter means comprises a multi-bit counter counting down from the delay count to zero, the multi-bit counter asserting a one-bit Terminal Count signal when reaching zero.

21. A dedicated hardware timer according to claim 19, wherein the counter means comprises a multi-bit counter counting up from the delay count to the predetermined count such that the count disable means disables the multi-bit counter upon the multi-bit counter reaching the predetermined count.

22. A dedicated hardware timer according to claim 19, further comprising a bi-directional port for both writing the delay count and reading the status of the counter means to the BIOS.

23. A dedicated hardware timer according to claim 19, wherein the counter means has separate ports for writing the delay count and reading the status of the counter means for the BIOS.

24. A dedicated hardware timer according to claim 20, wherein the read control means comprises:

NAND gate means for generating an ENABLE signal when both the predetermined read port is specified by the read command and the read command is valid; and latch means coupled to the NAND gate means for receiving the read command, the one-bit Terminal Count, and the ENABLE signal, the latch means for latching the status of the one-bit Terminal Count upon activation of the read command and outputting the one-bit Terminal Count as a least significant bit for the status of the counter means upon the ENABLE signal from the NAND gate means.

25. A dedicated hardware timer according to claim 24, wherein the first address decoding means is an equality comparator for comparing the write port address with a predetermined port address associated with said predetermined write port.

26. A dedicated hardware timer according to claim 25, wherein the predetermined write port is an Input/Output (I/O) port.

27. A dedicated hardware timer according to claim 25, wherein the predetermined write port is a memory port.

* * * * *